United States Patent [19]
Georges

[11] Patent Number: 4,476,504
[45] Date of Patent: Oct. 9, 1984

[54] DATA CARTRIDGE TAPE DRIVE ASSEMBLY

[76] Inventor: Michael P. Georges, P.O. Box 800, Norwood, Mass. 02062

[21] Appl. No.: 259,853

[22] Filed: May 4, 1981

[51] Int. Cl.$^3$ .......................... G11B 5/78; G11B 15/00
[52] U.S. Cl. ..................................... 360/93; 360/96.5; 242/192
[58] Field of Search ........................ 360/93, 96.5–96.6, 360/96.3, 96.4, 69, 73, 74.6; 242/198, 192, 200

[56] References Cited

U.S. PATENT DOCUMENTS

| | | | |
|---|---|---|---|
| 3,829,033 | 8/1974 | Cousino | 360/93 |
| 3,977,624 | 8/1976 | Leifer et al. | 242/198 |
| 4,085,906 | 4/1978 | Dahl et al. | 242/192 |
| 4,099,686 | 7/1978 | Moya | 242/198 |
| 4,199,795 | 4/1980 | Hunter | 360/93 |
| 4,250,527 | 2/1981 | Broghammer | 360/96.5 |
| 4,303,955 | 12/1981 | Kramer | 360/93 |

OTHER PUBLICATIONS

Strickland, "Velocity Sensing-The Parameter for a Complete Tape Transport Motion Control", Jour. of the Audio Eng. Soc., 11/1972, vol. 20, No. 9, pp. 743–749.

*Primary Examiner*—Stuart N. Hecker
*Attorney, Agent, or Firm*—George W. Neuner; Charles E. Pfund

[57] ABSTRACT

A cartridge tape drive assembly is described for receiving a cartridge containing magnetic tape, locating said cartridge in a fixed operational position, and moving said magnetic tape within said cartridge. The drive assembly comprises locating means for receiving and positively locating a data tape cartridge in an operating position; drive means for contacting said data tape cartridge to transport magnetic tape within said data tape cartridge; input-output means for reading information from or placing information on said magnetic tape; and control means for detecting the presence of a data tape cartridge in said drive assembly and for controlling the input and output modes of operation of said input-output means; said locating means comprising a pair of non-movable reference surfaces at right angles to each other for cooperating with the cartridge and means for urging said data cartridge into contact with said reference surfaces.

8 Claims, 9 Drawing Figures

DATA CARTRIDGE TAPE DRIVE ASSEMBLY

FIELD OF THE INVENTION

This invention relates to data cartridge tape drive assemblies for use with industry standard capstan driven magnetic tape data cartridges used for storage and retieval of computational data. In particular, the data cartridge tape drive assembly of this invention provides positive positioning and locking of the data tape cartridge in place while maintaining ease of inserting and removing the cartridge.

BACKGROUND OF THE INVENTION

Magnetic tape data cartridges have the capability for high data capacity and are easily and convenient to use for many computer applications. Computer equipment using such data cartridges are equipped with a tape drive system or assembly that accepts the cartridges, positions them for reading or recording, and permits removal of the cartridges. The data cartridge drive system has become accepted as a utilitaian storage system by major portions of the computer industry. Not only are computer systems becoming cartridge-equipped, but so are a great many auxiliary and supportive devices.

Data cartridges supply good performance and reliability. Data cartridge design permits accurate reading and writing of digital data, repetively and rapidly. Total encapsulation of tape in the cartridge provides superior tape protection from dropout producing dust, debris and fingerprints. Rigid base plate, captive and controlled enclosure of tape and precise tape guidance system assure excellent mechanical alignment. Size, packaging and design combine to make this medium tolerant to the potentially rougher care by users unskilled in handling computer media and in less-than-ideal environment conditions.

The following types of systems—minicomputers for machine control, data logging for sensor-based systems, word processing, key-to-tape storage for terminals, source data in inventory control—all have one functional need in common, i.e., a removable storage system. Further, general requirements for these systems are that the data storage media be small, inexpensive, interchangeable, and easily inserted in a lowcost drive.

Typical magnetic tape data cartridges, such as the DC 100A and DC 300A 3M Company data cartridges have the capability of high data capacity, are compact in size, have compact drive assemblies, are reliable and are easy and convenient to use for many data processing and data storage and retrieval applications such as computer mass storage. The physical dimensions of such data cartridges have been standardized. Computer and other data processing equipment using such data cartridges are equipped with a tape drive that accepts insertion of a data cartridge, positions the data cartridge for reading or recording, and allows removal of the data cartridge in order to make the tape drive available for another interchangeable data cartridge. The tape drive assembly must provide repeated reliable interface with the data cartridge both mechanically and electrically.

Known data cartridge tape drives are dificient for reliably and repeatedly mechanically positioning the data tape cartridge for good electrical interface, i.e., reading and recording of data, or if they do positively position the cartridge, the cartridge is difficult to remove from the tape drive because of the high holding force used for secure positioning. Some tape drive designs provide a locking force release device that is actuated by a push button. The mechanism of such a locking force release device adds to the size, cost, and complexity of the design.

Thus, it would be desirable to have a simple tape drive assembly for data cartridges that would positively, repeatedly, and reliably position the data cartridge in a simple manner for accurate mechanical and electrical interface with the tape drive while maintaining the ease of inserting and removing the data cartridge.

SUMMARY OF THE INVENTION

The present invention provides a drive assembly for a computer data tape cartridge that has positive positioning, seating and locking of the tape cartridge in its operating or interface position to provide reliable mechanical contact with switches and positive motor capstna drive contact with the tape cartridge drive wheel, while permitting ease of inserting and removing of the cartridge. The cartridge tape drive of this invention is compact and simple in overall construction having few total parts and even fewer moving parts, thus presenting minimal manufacturing tolerance problems.

In accord with the present invention a cartridge tape drive assembly for receiving a cartridge containing magnetic tape, locating said cartridge in a fixed operational position, and moving said magnetic tape within said cartridge, comprises:

A. locating means for receiving and positively locating a data tape cartridge in an operating position;

B. drive means for contacting said data tape cartridge to transport magnetic tape within said data tape cartridge;

C. input-output means for reading information from or placing information on said magnetic tape; and D. control means for detecting the presence of a data tape cartridge in said drive assembly and for controlling the input and output modes of operation of said input-output means;

E. said locating means comprising a pair of non-movable reference surfaces at right angles to each other for coopering with said data cartridge and means for urging said data cartridge into contact with said reference surfaces.

In one embodiment the cartridge tape drive assembly of the present invention, comprises a baseplate having cartridge guide means for guiding the insertion of a data tape cartridge into said tape drive assembly; said guide means providing seating and positioning surfaces for said data tape cartridge to guide the data tape cartridge into its operating position and lock said data tape cartridge in said operating position; spring means for resiliently applying force against the data tape cartridge to contact the cartridge against said seating and positioning surfaces; drive means for driving the tape in said data tape cartridge, said drive means including a drive capstan; said drive capstan being resiliently urged into contact with said data tape cartridge for driving the tape contained therein; a magnetic tape read/write head for reading from and recording magnetic data onto the tape; and control means for selecting and controlling the function of the read/write head; wherein said cartridge guide means comprises a pair of channels, one located on each side of said baseplate, opening inwardly toward each other for receiving the edges of the base of the data tape cartridge, the top and bottom surfaces of each channel being substantially parallel, except at the innermost end of said channels wherein one surface converges toward said baseplate to narrow the channels and to provide said positioning surfaces to positively seat the data tape cartridge in its operating position and to prevent outward movement of said cartridge when seated in its operating position.

Thus, the data cartridge tape drive of this invention provides positive positioning and locking of the data cartridge in place in a stable mechanical and electrical interface position while maintaining ease of inserting and removing of the cartridge. In a preferred embodiment, the invention further provides means for placing and interfacing of the control means, including the write/protect and cartridge present switches, with a data cartridge to accomodate adequate over-travel of the switch actuators, thus achieving positive switch contact and obtaining control switching reliability.

Another embodiment provides a spring loaded pivot arrangement for the motor/drive capstan/shaft encoder disc assembly that assures full face to face contact of tape drive capstan with data cartridge drive wheel to maintain reliable and accurate tape movement. This also allows a single ended and shorter motor drive shaft extension in which the drive capstan is positioned closer to the near side motor shaft bearing for less side torque on the bearing and therefore greater motor bearing life, and which also allows the motor shaft encoder disc to be placed on the same end of the motor shaft as the drive capstan and adjacent to the capstan in a compact arragement. These improvements result in greater reliability, lower cost and a more compact size data cartridge drive assembly.

DESCRIPTION OF THE INVENTION

The present invention provides a simple and compact drive assembly for a data cartridge and has positive and accurate positioning, seating, and locking of the tape cartridge in its operating or interface position to provide reliable mechanical contact with the data cartridge presence and read/write switches and has positive motor capstan drive contact with the tape cartridge drive wheel, while permitting ease of insertion and removal of the data cartridge.

The data cartridge tape drive of this invention is compact, is simple in overall construction, has few total parts, and has very few moving parts. This simplicity in construction results in lower cost, in the elimination of many tolerancing and fitting problems in manufacture and assembly, in easier and faster manufacture, in a more compact device, and in a more reliable product.

The cartridge tape drive assembly of this invention will now be described with particular reference to one embodiment of the invention as illustrated in the accompanying drawings.

Figure 1:
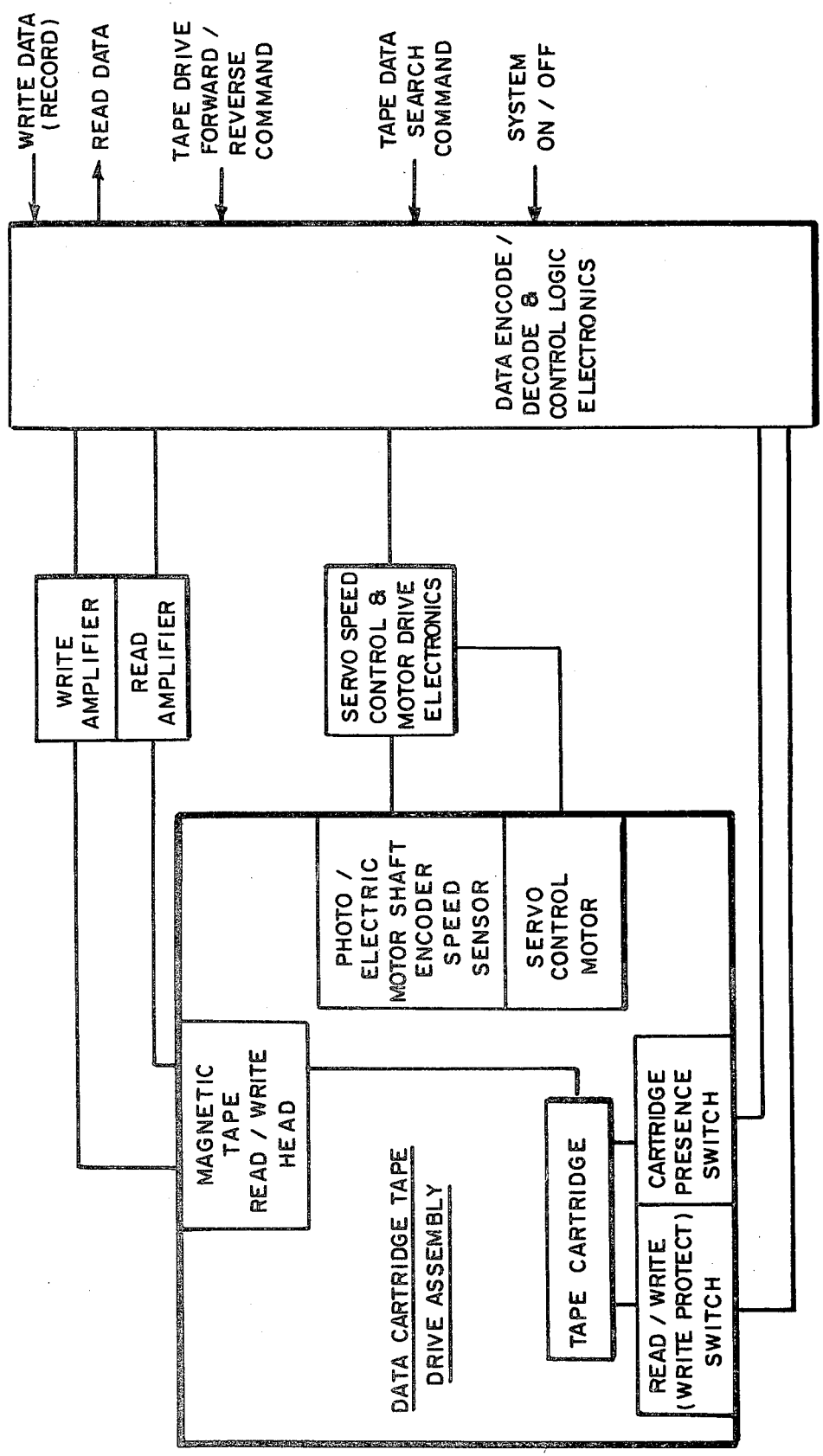
FIG. 1 is an electro-mechanical block diagram for the data cartridge tape drive in accord with the invention.
Figure 2:
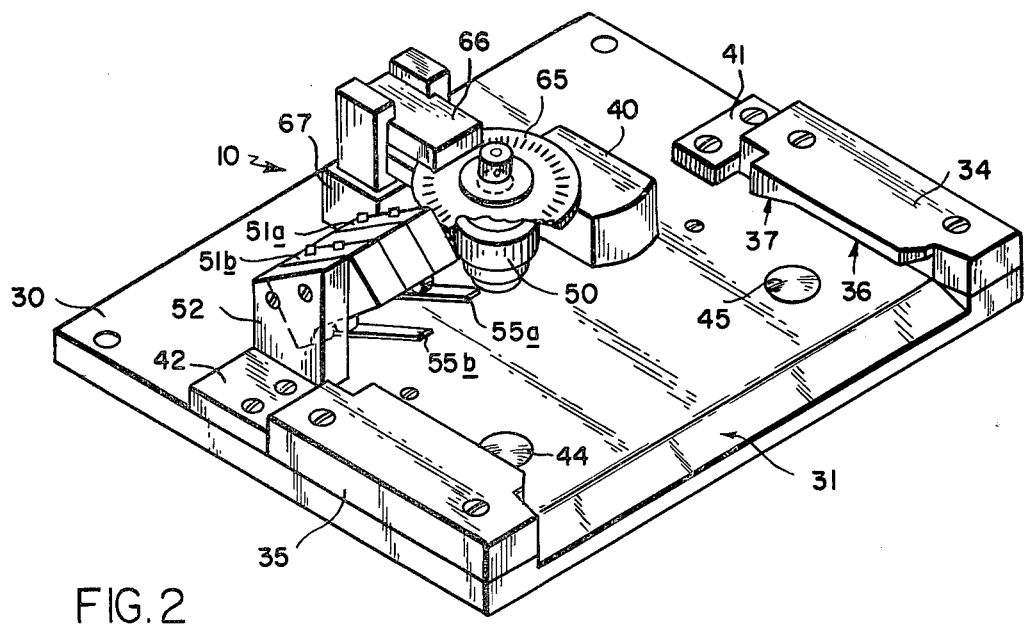
FIG. 2 is an isometric view of a data cartridge tape drive assembly in accord with one embodiment of the invention.
Figure 7:
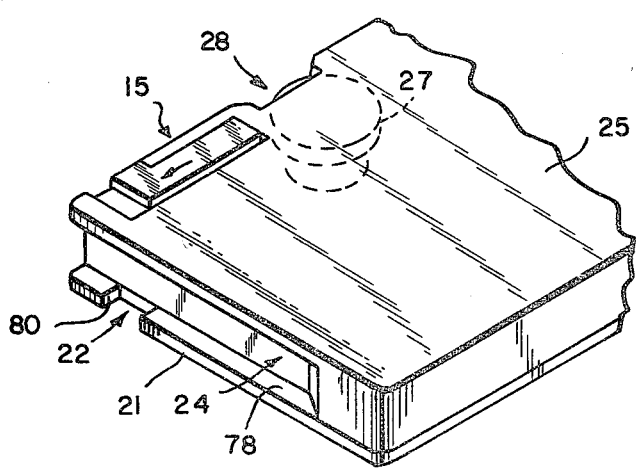
FIG. 7 is a partial isometric view of a typical tape cartridge having a rectangular cutout in the edge of the base plate near the forward end of the cartridge.
Figure 8:
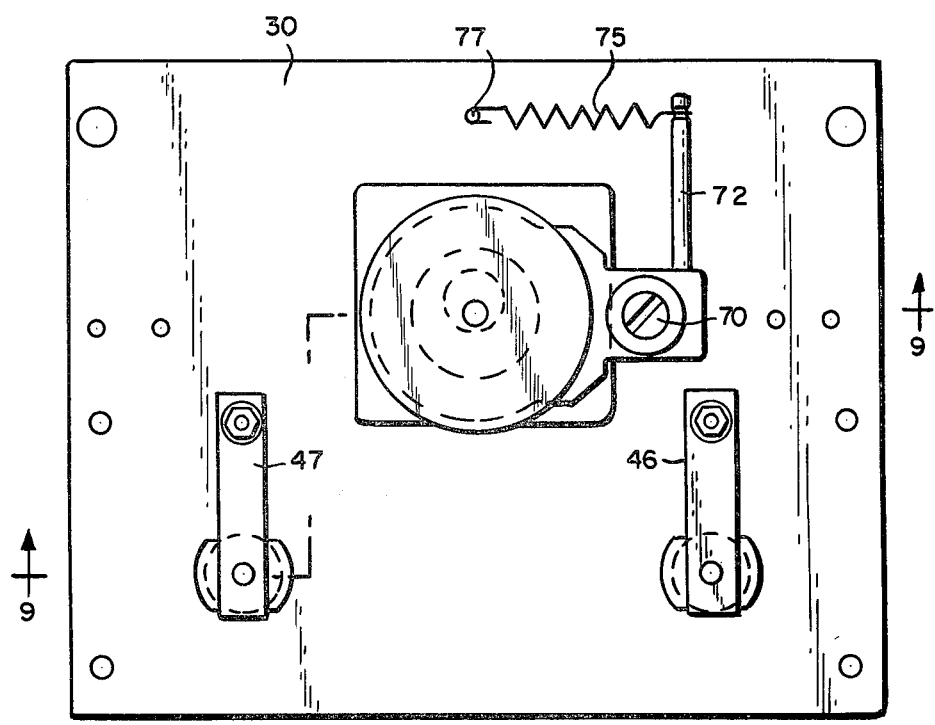
FIG. 8 is a bottom view of the drive assembly of FIG. 3.
Figure 9:
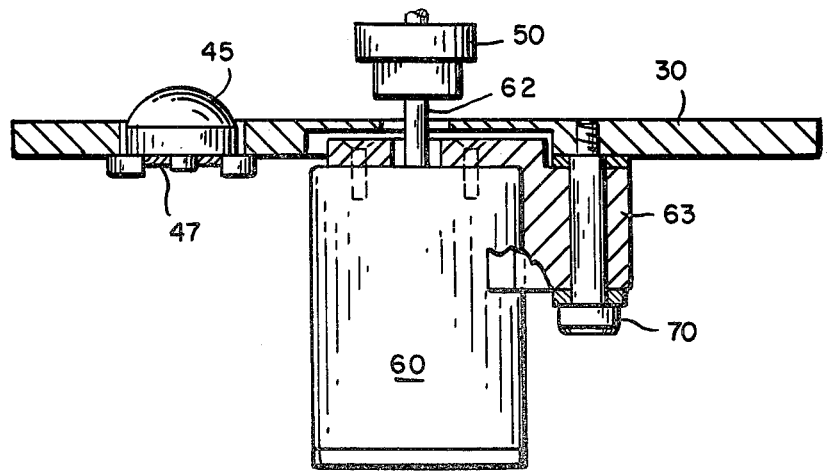
FIG. 9 is a partial front view of the drive assembly of FIG. 8 along line 9—9.

The cartridge tape drive assembly 10 as illustrated in FIG. 2, is adapted to receive a standard magnetic tape data cartridge 15 such as that illustrated in FIG. 7. Typically, such data tape cartridges 15 comprise a rectangular cover 25 on a base plate 21 having a rectangular cutout 22 on each side of the cartridge base plate. A recessed surface 24 on each side of the cartridge cover 15 exposes part of the rigid baseplate 21 and provides a means for guiding the cartridge by using the exposed edges and surfaces of base plate 21 to cooperate with the structure of the tape drive assembly when inserting the cartridge 15 into tape drive assembly 10. Such data tape cartridges are described in more detail in, for instance, U.S. Pat. No. 3,692,255, which is hereby incorporated by reference.

The cartridge data tape drive assembly 10 comprises a base plate 30 having a beveled leading edge 31 to facilitate insertion of a data tape cartridge 15. Edge guides 34 and 35 are provided on each side of the data tape drive assembly to provide reference surfaces to guide the tape cartridge into position for interface with the tape driven capstan 50 and the read/write head 40. The edge guides 34 and 35 together with the tape drive assembly base plate 30 form channels or recesses into which the edges of the cartridge base plate 21 are inserted. The lower surface 36 of the edge guide 34, i.e., the upper interior surface of the channel facing the tape drive assembly base plate 30, forms one reference surface and is parallel to the surface of the tape drive assembly base plate 30 until the rearward end of the edge guide where the surface declines and converges toward the tape drive assembly base plate 30 forming an angled surface 37 that is continuous with surface 36 of edge guide 34. The end of the edge guide forms a second reference surface 38 which is perpendicular to refernce surface 36. Edge guide 35 is similarly constructed. Adjacent to edge guides 34, 35 are limit stops 41 and 42 which limit the travel of the tape cartridge 15 when inserted.

Bearing surfaces 44 and 45 are resiliently mounting in tape drive assembly base plate 30 and preferably have a curved surface the protrudes above the surface of the tape drive assembly base plate 30 (functioning in a manner similar to a cam) to urge the upper surface 78 of the data cartridge base plate 21 of the data tape cartridge into contact with the lower surfaces of the edge guides 34 and 35, e.g., surface 36 of edge guide 34. The bearing surfaces 44, 45 are positioned by means of leaf springs 46 and 47 which are fastened to the bottom of the tape drive assembly base plate and support the bearings in circular openings in base plate 30.

Electrical limit switches 51a and 51b are mounted onto tape drive assembly base plate 30 by means of structure 52 and positioned so that levers or actuators 55a and 55b are activated by data tape cartridge when inserted into its operating position in the tape drive assembly 10. When the data tape cartridge 15 is inserted into the tape drive assembly 10 and fixed in its operating position, levers 55a and 55b are selectively contacted by the cartridge and moved in a plane perpendicular to the tape drive assembly baseplate 30 to actuate switches 51a and 51b, respectively. Levers 55a and 55b and conveniently positioned on an angle to baseplate to obtain positive control of the switch tolerance band thereby accomodating over-travel and providing reliable contacts.

A drive motor 60 is mounted on the bottom of tape drive assembly baseplate 30 and the drive shaft 62 projects through the tape drive assembly baseplate 30 so that the drive capstan 50 and the encoder wheel 65 are positioned above the tape drive assembly baseplate 30. Photoelectric sensing device 66 is positioned to monitor the slits in the encoder wheel 65 by means of structure 67.

The drive motor 60 is attached to the tape drive assembly baseplate 30 by mounting structure 63 that can pivot about pin 70. Rod 72 extending from motor mounting structure 63 is resiliently attached to tape drive baseplate 30 by means of spring 75 that is attached at pin 77.

The mechanical operation of the tape drive assembly 10 is illustrated in FIGS. 4 through 7. The data tape cartridge 15 in general use is rectangular in shape and relatively thin. The cover 25 of the cartridge 15 is recessed along each side to expose the edge of the cartridge base plate 21. The exposed edges of the base plate 21 fit into the channels formed by edge guides 34 and 35 and the tape drive assembly base plate 30. The edges of the cartridge base plate 21 are used for guiding, positioning and retaining the cartridge 15 in the tape drive assembly 10.

When the data tape cartridge 15 is inserted into the tape drive assembly 10, the beveled edge 31 of the tape drive base plate 30 aids the edges of the cartridge base plate 21 to center the channels formed by edge guides 34 and 35 and tape drive assembly base plate 30. One edge of the data cartridge base plate 21 slides along reference surface 36 as the cartridge baseplate slides over bearing surface 45 which recedes into the tape drive assembly base plate 30 but maintains pressure against the cartridge base plate 21 and urges the cartridge base plate 21 against reference surface 36 due to the resilient force of leaf spring 47. The leading portion of the edge of the cartridge baseplate 21 then slides along the declining surface 37 until the rectangular-shaped opening 22 near the leading edge of the cartridge passes the perpendicular reference surface 38 whereupon the inner surface 78 of the cartridge baseplate 21 snaps upward against reference surface 36 due to the urging by bearing surface 45.

When the inner surface 78 of cartridge baseplate 21 snaps into parallel contact with edge guide surface 36, the cartridge tape drive wheel 27 is in contact with tape drive capstan 50 which is urged into contact with drive wheel 27 by spring 75. The resilient force provided by spring 75 limits the travel of the cartridge into the tape drive assembly and urges the data cartridge into contact with the second reference surface 38. Limit stops 41 and 42 prevent the data tape cartridge 15 from being jammed into too far into the drive assembly 10 and thus causing damage to the magnetic read/write head 40 or the switches 51a and 51b. When the data cartridge is inserted in the drive assembly, levers 55a and 55b of switches 51a and 51b are selectively engaged and activated by the data cartridge body at the contact area. A cutout is generally provided so that one lever can remain unactivated and prevent erasure or write-over of the tape. In FIG. 7, this function is accomplished by slider 29 which permits selective activation of the switches or activation of both switches. When the cartridge 15 is in its operation positing, the magnetic read/write head 40.

Figure 3:
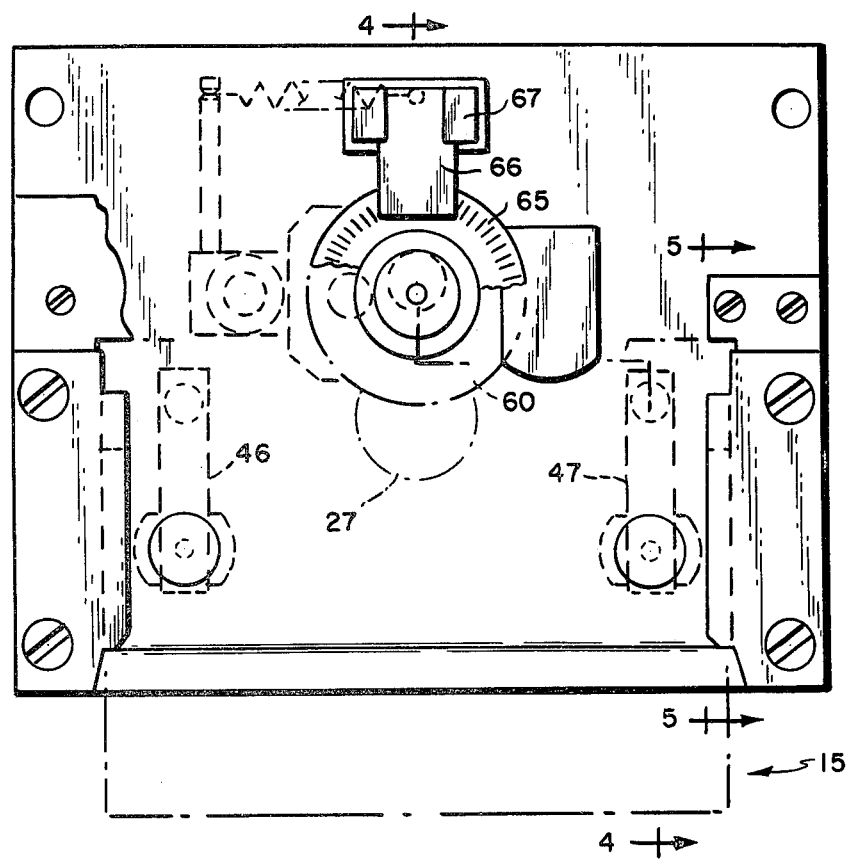
FIG. 3 is a plan view, partially cut away, of the tape drive assembly of FIG. 2 illustrating the outline of a tape cartridge inserted into the drive assembly.
Figure 4:
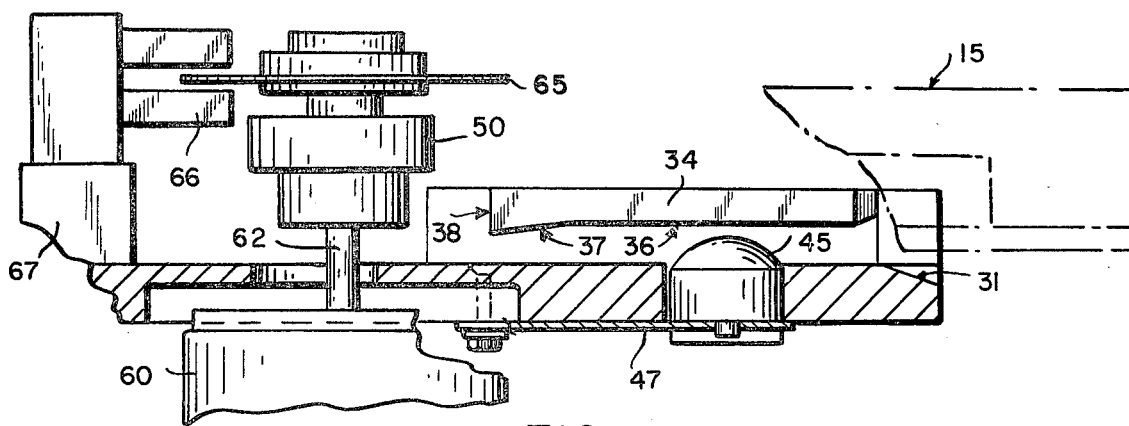
FIG. 4 is a cross-sectional left side view, partially cut away, of the tape assembly of FIG. 2
Figure 5:
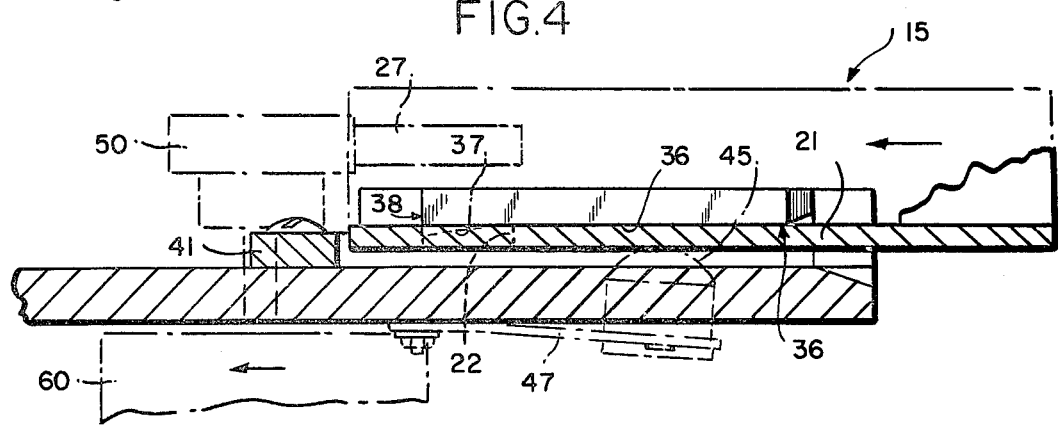
FIG. 5 is a cross-sectional left side view, partially cut away, of the tape drive assembly of FIG. 2 illustrating a tape cartridge inserted therein.

As can be readily seen by referring to the Figs. and particularly FIGS. 3 through 5, the structural relationship between rectangular opening 22 in the cartridge baseplate 21 and reference surfaces 36 and 38 of the edge guide 34 positively retains or locks the data cartridge 15 in the drive assembly 10 and the urging of the drive capstan 50 against drive wheel 27 by motor spring 75 keeps the forward edge 80 of the rectangular opening 22 in the cartridge baseplate 21 in contact with reference surface 38. Auxiliary resilient means operating directly on the cartridge housing can be used to assist motor spring 75 to retain the data cartridge in operating position against reference surface 38 while permitting the use of lighter contact force between the drive wheel 27 and drive capstan 50. Such auxiliary springs can be conveniently mounted by those skilled in the art.

Figure 6:
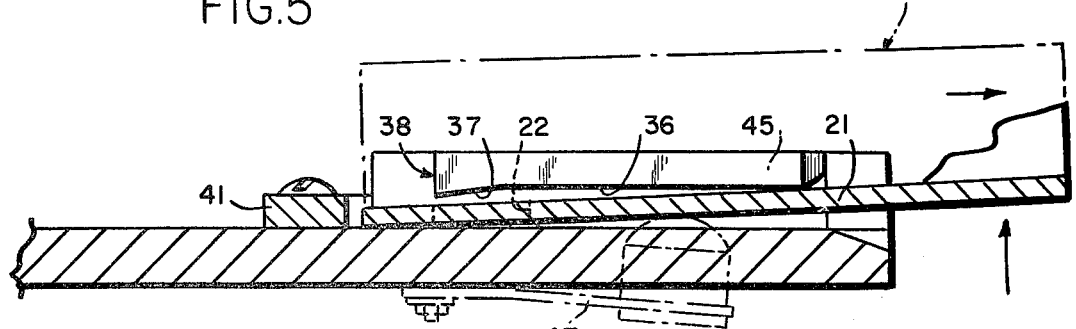
FIG. 6 is a cross-sectional left side view of the tape drive assembly of FIG. 2 illustrating the position of a tape cartridge for removal from the drive assembly.

However, the cartridge 15 can be easily removed from the drive assembly 10 by lifting upwardly on the outer end of the cartridge and simultaneously pulling the cartridge out (FIG. 6). As illustrated in FIG. 6, this motion allows the forward edge 80 of the rectangular opening 22 in the edge of the baseplate 21 to clear edge guide surface 38 and the cartridge can be withdrawn with ease. No retaining mechanism force need be overcome nor need any locking structure be displaced to remove the data cartridge 15 from the tape drive assembly 10 as in prior art devices.

An alternate cartridge unlocking action is also possible with this tape drive assembly. The cartridge 15 can be pushed forward toward the limit stops 41, 42 as the outer end of the cartridge is lifted upward. The cartridge lifting action will pivot the cartridge on the spring loaded bearing surfaces 44, 45 and illustrated in FIG. 6 and the forward edge 80 of the rectangular opening 22 of the cartridge baseplate 21 will clear the reference surface 38. The pushing action of spring 75 which normally keeps a driving force against the drive wheel (and auxiliary resilient means, if used, which normally keeps the cartridge in contact with reference surface 38) assists in ejecting the cartridge past reference surface 38 and out of the locking position where upon the cartridge can be easily withdrawn.

The drive motor 60 is preferably a servomotor controlled at a constant speed by a feedback circuit the monitors the rotational speed using encoder wheel 65 and a photoelectric sensing device 66.

Although the present invention has been described in detail, it can be appreciated that modifications and improvements within the spirit and scope of this invention may be made by those skilled in the art upon consideration of this disclosure.

I claim:

1. A tape drive assembly for use with a magnetic tape data cartridge in electronic data processing applications, for transport of the magnetic tape enclosed in the data cartridge when the data cartridge is positioned in the tape drive assembly, said tape drive assembly comprising:

A. guide means for inserting and positioning a data cartridge into an operating position in said tape drive assembly:

B. locking means for holding the data cartridge accurately aligned and stationary in said operating position;

C. drive means for contacting and rotating a drive wheel in the data cartridge in order to transport the magnetic tape within the data cartridge;

D. magnetic means for reading and writing of magnetic data on the magnetic tape; and E. switching means for detecting the presence of a data cartridge in said operating position and for controlling the function of said magnetic means for effecting the magnetic data on the magnetic tape;

F. said guide means further comprising (1) two channels that are parallel to each other and spaced apart with the flanges of said channels facing each other to form a recess wherein the exposed edges of the data cartridge baseplate may be inserted for accepting the data cartridge baseplate, the channels each having an inner flange surface in the recess that serves as a first reference surface for the data cartridge baseplate to align the data cartridge in a plane in said tape drive assembly, and (2) a resilient bearing surface to urge said data cartridge into contact with said first reference surface;

G. said locking means further comprising (1) an angled surface extending from said inner flanged surface of said channels, functioning to narrow the recess, and terminating in a second reference surface perpendicular to said first reference surface, said angled surface and said second reference surface cooperating with the data cartridge to lock the data cartridge in the operating position, and (2) resilient force means to limit the travel of the data cartridge into said tape drive assembly and to push the data cartridge back in the direction from which it was inserted and urge the data cartridge into contact with said second reference surface.

2. A cartridge tape drive assembly for receiving a cartridge containing a magnetic tape, positioning said cartridge in a fixed operational position, and moving said magnetic tape within said cartridge, said drive assembly comprising:

A. a baseplate having guide means for facilitating the insertion and positioning of a data tape cartridge into said drive assembly.

B. head means for reading from and/or writing on the tape, said head means mounted on said baseplate;

C. drive means for moving the tape past said head means to read data from or write data on said tape, said drive means being mounted on said baseplate; and D. switch means mounted on said base plate for activing the drive assembly;

said guide means comprising (1) a guide surface having a first portion parallel to the opposing surface of said base plate and a second portion angled toward said base plate and ending with a reference surface perpendicular to said opposing surface of the base plate and (2) bearing surface means for resiliently urging the cartridge against said guide surface and for cooperating with said guide surface and said reference surface to position and positively retain the cartridge in said drive assembly for mechanical and electrical interface therewith.

3. The drive assembly of claim 2 further comprising limit means for preventing further forward motion of the data cartridge when it it inserted into the drive assembly.

4. The drive assembly of claim 2 wherein said bearing surface means comprise an arcuately shaped bearing surface protruding through the surface of said base plate toward said guide surface, said bearing surface being urged to protrude through the baseplate by spring means.

5. The drive assembly of claim 2 wherein said drive means comprises a drive capstan for contacting a drive wheel in the tape cartridge to move tape within the cartridge.

6. The drive assembly of claim 5 wherein said drive capstan is resiliently urged into contact with the drive wheel by drive spring means.

7. The tape drive assembly of claim 5 wherein said drive means comprises a servo controlled motor, an encoder disc mounted on the motor drive shaft adjacent to said drive capstan, and photoelectric detection means for determining the speed of the encoder wheel and providing output signals for controlling the motor speed.

8. The drive assembly of claim 2 wherein said drive means comprises a servo controlled motor, an encoder disc mounted on the motor drive shaft, and photoelectric detection means for determining the speed of the encoder wheel and providing output signals for controlling the motor speed.

* * * * *